United States Patent [19]

Schadler

[11] 4,362,125

[45] Dec. 7, 1982

[54] QUARTZ OSCILLATOR MEASURING HEAD

[75] Inventor: Walter Schadler, Triesen, Liechtenstein

[73] Assignee: Balzers Aktiengesellschaft, Liechtenstein

[21] Appl. No.: 283,885

[22] Filed: Jul. 16, 1981

[30] Foreign Application Priority Data

Jul. 21, 1980 [CH] Switzerland .......... 5557/80

[51] Int. Cl.³ .......................... B05C 11/00
[52] U.S. Cl. .................... 118/712; 118/664; 118/665; 118/715; 427/10; 324/71 R
[58] Field of Search .......... 118/665, 712, 714, 715, 118/730, 664; 427/9, 10, 8; 324/71 R, 158 F, 73 AT; 310/311, 312

[56] References Cited

U.S. PATENT DOCUMENTS 3,383,238 5/1968 Unzicker et al. ............ 118/664 X
3,667,424 6/1972 Cornelius et al. ............ 118/730
4,207,836 6/1980 Nonaka .................... 118/712 X

OTHER PUBLICATIONS

King et al., "Observations on a Quartz/Crystal Deposition Monitor", *Journal of Physics E: Scientific Instruments, 1971*, vol. 4, No. 12, (Dec. 1971).

*Primary Examiner*—John D. Smith
*Assistant Examiner*—Bernard F. Plantz
*Attorney, Agent, or Firm*—McGlew and Tuttle

[57] ABSTRACT

An oscillator crystal measuring head is disclosed, for vacuum coating apparatus, intended for measuring the mass of substance which is deposited on an oscillator crystal during a deposition of thin layers, and by which the frequency of the crystal is changed. To obtain a longer, continuous measuring period, the measuring head is designed with a crystal changer in the form of a rotary support and to ensure that always identical surface areas of each crystal are coated, further apertured screens are provided in addition to an apertured screen which is fixed to the housing. These further screens are moved along with the individual crystals and can be pressed, in their measuring position, into heat conducting contact with the fixed screen. The movable screens may be designed as a single rotary screen plate which can be pressed against the fixed screen by a spring.

7 Claims, 2 Drawing Figures

Fig. I
(PRIOR ART)
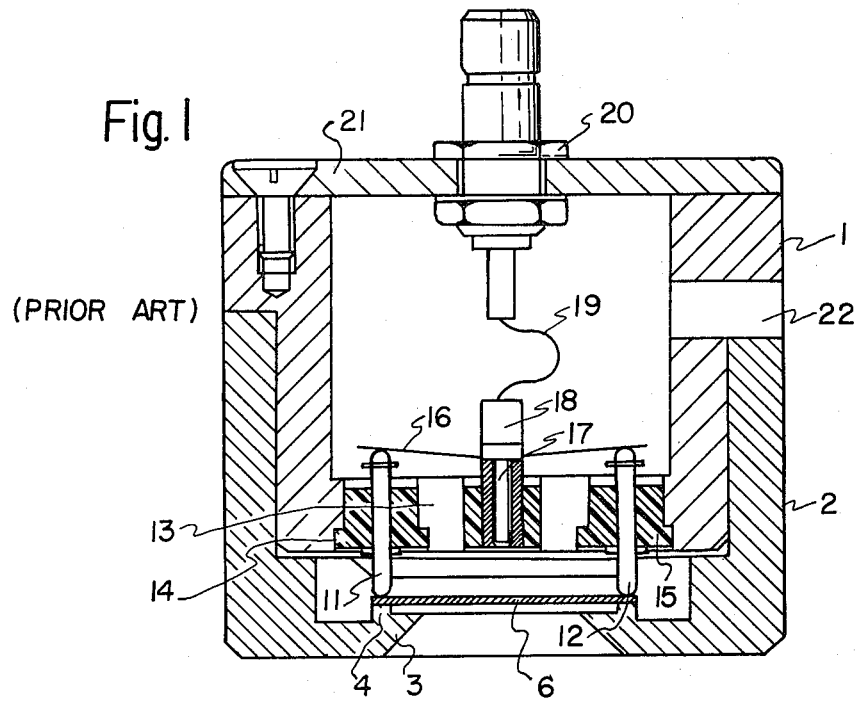
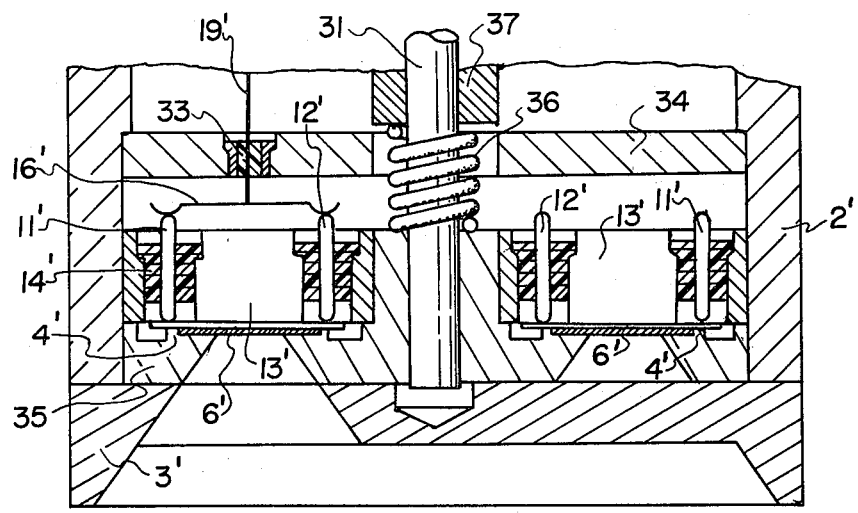
Fig. 2

QUARTZ OSCILLATOR MEASURING HEAD

FIELD AND BACKGROUND OF THE INVENTION

The present invention relates in general to instruments for measuring the vapor deposition quantities and rates of vacuum coating apparatus and, in particular a new and useful oscillator crystal measuring head and arrangement.

Quartz oscillators have long been employed in thin layer deposition operations, for determining the layer thickness and for measuring the rate of coating (i.e. the mass of substance deposited per unit time), during thin layer deposition operation. An example is in vacuum evaporation techniques. In such a process, a layer is deposited on an oscillator crystal of a quartz controlled oscillator which is accommodated in the evaporator, and the mass of the layer changes the frequency of the oscillator crystal. The determined change in frequency may then serve as a measure of the thickness of the deposited layer and the frequency change per unit time as a measure of the rate of coating. (See for example, German OS 2 053 154, U.S. Pat. Nos. 3,383,842 and 3,541,894, French Pat. Nos. 1,389,513).

A prerequisite for employing this known oscillator crystal measuring method, particularly if optical thin layer systems are deposited, is a sensitive and reliably operating apparatus for measuring the frequency of the crystal. In prior art devices, the frequency of the measuring oscillator, depending on the mass deposited on the crystal, has been compared with a high-stability reference oscillator. Recently, however, the frequency of the crystal is often measured directly, by a digital frequency counter. The rate of coating can be determined from the frequency variation per unit time.

Experience has shown that one of the most important sources of trouble and error during operation of such devices is in the mounting of the oscillator crystal. This becomes manifest already if the crystal is simply removed from its holder without any other change, and then reinserted into place. The frequency is changed. Even abrupt frequency jumps may occur during an operation, which probably are caused by mechanical or thermal strain on the retained crystal. Such trouble appears particularly with conventional oscillator crystal holders in which the rim of a circular quartz slab is pressed, by springs, against an annular face, and disturbances may be due to an uneven contact face or to dust particles which penetrated between the contact face and the crystal during the clamping operation.

To overcome these difficulties, it has already been provided to hold the oscillator crystal fast only at two points of its circumference. For this purpose, two parts of fixing jaws are used, for example, between which the quartz slab is clamped. It is a disadvantage however, that this makes the frequency required exchange of the crystals complicated. That is, the fixing jaws must be spread apart to be able to remove one quartz slab and reinsert another. Skill is needed for the operation and the loss of time connected thereto is undesirable in an industrial application of thin layers deposition techniques.

To obtain a mounting which satisfies the requirements of measurement and permits an easy exchange of the crystals, a solution has been proposed which is illustrated in FIG. 1 of the accompanying drawing. This design will now be briefly explained to permit ease in understanding the present invention.

FIG. 1 shows a housing of an oscillator crystal measuring head comprising two parts 1 and 2. Part 2 is provided with a window 3 and, with the measuring head employed in a coating apparatus (with vapor deposition or cathode sputtering), the window will be oriented to face the stream of particles to be deposited. This stream is directed from mostly below, upwardly, so that the measuring head is used in the shown position (with its longitudinal axis extending vertically).

Along the periphery of window 3, part 2 is provided with at least two contact faces 4 for the oscillator crystal slab 6, which faces have the configuration of circular segments. Two contact pins 11, 12 are supported by the upper part 1 of the measuring head, in a supporting plate 13 of this part and by means of insulating guide bushings 14, 15. A spring 16 presses pins 11, 12 against the contact faces, so that crystal slab 6 is firmly held in its position. Spring 16 in turn is supported on a column 17 which is carried by, and insulated against, supporting plate 13 and provided with a connecting lug 18 for an electrical conductor 19 leading to the outside through a bushing insulator 20 passed through a closing plate 21 of part 1 of the measuring head. It is frequently advisable however, to accommodate the oscillator crystal along with the other parts of the measuring oscillator within the same housing. Then, the housing provides an electrical shielding at the same time. In such a case, bushing 20 may be used not only for leading the measurement signal away but also for supplying operating voltage for the oscillator.

The crystal has two metallic coatings in a known manner. The two metallic coatings of the oscillator crystal slab are electrically contacted on the underside, by the two metallic contact faces 4 which are in electrical connection with the grounded housing, and on the top side by the two contact pins 11 and 12. It is a common practice to provide only the central portion of each of the two sides of the oscillator crystal slab with a metallic coating, with metallic conducting tracks leading to the periphery, for example, semi-circular contact faces. To ensure a correct position of the upper and lower housing parts upon assembly, a fixing or snap-action element may be provided, such as a pin 22 which permits closing of the housing only in a definite position of the two parts.

The arrangement described in the foregoing makes it possible to remove the oscillator crystal slab from the mount and insert it agian, without causing an appreciable frequency change. Disturbances due to inattentive insertion, dust particles, compression, etc., have not been observed either. A disadvantage remains however, in that no longer continuous operation is possible, because of the necessary frequent exchange of the crystals.

SUMMARY OF THE INVENTION

The present invention is directed to an oscillator crystal mounting which is reliable in operation to the same extent as in the aforedescribed prior art arrangement, but at the same time designed as a crystal changer which permits easy and fast exchange of crystals. The problem arising in the past is that it is difficult to adjust an individual crystal in its measuring position, accurately. That is, each measuring operation requires a coating of exactly the same window area of the crystal surface, if reproducible measuring results are to be obtained. If, for example, due to an inaccurate positioning relative to the window, the coated area of the crystal surface is displaced in consecutive measurements, a somewhat different natural frequency will result therefrom with an otherwise equal coating. Very high requirements of accuracy are thus imposed on a mechanism for fixing the angular position in a rotary crystal changer. Another objective of the invention is a satisfactory temperature stabilization of a plurality of individual quartz crystals accommodated in a single oscillator crystal measuring head. That is, it is difficult in a changer to ensure a constant head dissipation from the crystal which is just in a measuring position, and the same temperature of all of the crystals during the measuring operation. On the other hand, unequal temperatures would result in different natural frequencies of the crystals, and thus to errors in measurement.

Accordingly, a further object of the invention is to provide an oscillator crystal measuring head for vacuum coating apparatus, for determining the mass of substance which is being deposited on an oscillator crystal during a deposition of thin layers by a vapor stream, and by which the frequency of the crystal is changed, comprising a housing, a support in said housing which carries a plurality of oscillator crystals, mounting means connected to the support for rotary motion of the support within the housing and for bringing one of the oscillator crystals at a time into a position for receiving a vapor stream, the housing having a window in that vapor stream receiving position of the crystal. The support includes a plurality of screens each associated with a single crystal, each screen having an aperture which is alignable with the window of the housing when the crystal associated with that screen is in its measuring position.

The possibility of exchanging the crystals used for measuring, without opening the coating apparatus and interrupting the treatment, and the provided simultaneous and secure heat dissipation from the crystals to the housing, make sure that a substantially longer, uninterrupted measuring time is obtained. In practice, this measuring time is now determined by the sum of the masses of substance which can be deposited on the individual crystals, thus the time is greatly augmented.

In accordance with an advantageous development of the invention, the screen apertures associated with the individual crystals are provided in a common rotary plate serving as a multiple screen which is designed for being displaceable in the axial direction and to be pressed, for example, by a spring, against the screen which is fixed to the housing.

Another object of the invention is to provide an oscillator measuring head which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE FIGURES

In the Drawings:

FIG. 1 is a side section view of a prior art measuring head for a single oscillator quartz, equipped with a single screen which is fixed to the housing; and FIG. 2 is a sectional view of an inventive measuring head designed as a multiple crystal changer and equipped with an additional screen plate having apertures for each individual crystal and moved along with the support of the crystals.

DESCRIPTION OF THE PREFERRED EMBODIMENT

Turning to the drawings in particular, the invention embodied therein, in FIG. 2 shows an arrangement for the support and mounting of oscillator crystals similar to that of FIG. 1 except that a plurality of crystals are mounted on a crystal changer assembly which permits the easy and rapid exchange of crystals which have all been exposed to similar conditions so that the problem of the prior art concerning frequency change is not encountered.

FIG. 2 shows only the lower part of an oscillator crystal measuring head, and parts of like function are indicated with the same numerals as in FIG. 1 except with a prime. The inventive embodiment according to FIG. 2 differs from the design of FIG. 1 in the following.

Mounted in housing 2' of the measuring head is a shaft 31. Shaft 31 is rigidly connected by its lower end to a fixing plate 13' which is intended for retaining a plurality of crystals 6' and is taken along by the rotary motion of shaft 31. To effect a contact between crystals 6' and the necessary conductors for supplying voltage, contact pins 11' and 12' are provided, as in the prior art design of FIG. 1, which are guided in insulating bushings 14'. The contact pins associated with the crystal just occupying its measuring position are pressed against the respective crystal by a spring 16'. The voltage is supplied to contact pins 11',12' through a conductor 19' which, through an insulating bushing 33, is held fast in a plate 34 fixed to the housing.

If fixing plate 13' is turned by one step, the respective next crystal 6' with its contact pins 11',12' is moved underneath spring 16'. The other contact necessary for the measuring circuit is provided by contact faces 4', through the mass of the electrically conducting housing. These contact faces are formed on the adjacent sides of screens 35 which are moved along and, as shown in FIG. 2, are most simply designed as a single screen plate having a corresponding number of apertures. Screen plate 35 cooperates with screen plate 3' which is fixed to the housing and has a single aperture or window for the the crystal which, at that time, is in its measuring position. To press screen plate 35 into heat conducting contact with screen plate 3', the simplest way is to provide a spring 36. Otherwise, if the measuring head is used in the vertical position, the weight alone of the fixing plate with the movable screens may provide a satisfactory contact pressure. If a more intense heat dissipation is desired, housing 2' or screen plate 3' may in addition be equipped with a cooling system.

Shaft 31 may be mounted in housing 2' through a bearing sleeve 37 and, for actuation, it may extend to the outside, or a drive motor may be provided within or ouside the housing of the measuring head, and an indexing mechanism known per se may be employed for arresting the shaft in the individual measuring positions. The exchange of the entire group of crystals is particularly simple in the design of FIG. 2. It suffices to unfasten screen plate 3' from the housing, to withdraw fixing plate 13' along with screen plate 35 and crystals 6', and to insert new, not yet coated crystals, whereupon plates 35 and 13' are pushed into the housing again, against the force of spring 36, and screen plate 3' is secured to the housing, for example by screws or bolts.

While a specific embodiment of the invention has been shown and described in detail to illustrate the application of the principles of the invention, it will be understood that the invention may be embodied otherwise without departing from such principles.

What is claimed is:

1. In an oscillator crystal measuring head for vacuum coating apparatus, for determining the mass of substance which is being deposited on an oscillator crystal during a deposition of thin layers by a vapor stream, and by which the frequency of the crystal is changed, comprising a housing, a support accommodated in said housing for at least one oscillator crystal, at least one electrical conductor connected to a mechanism for clamping the oscillator crystal and a screen rigidly connected to the housing and provided with a window exposing one side of the oscillator crystal to the vapor stream to be measured during the measuring operation, the improvement comprising, said support being mounted in said housing for performing a rotary motion and provided with retaining mechanisms for a plurality of oscillator crystals, each individual oscillator crystals being associated with further screens which are movable along therewith and provided with apertures to define surface areas of each crystal to be coated with at least the screen of the oscillator crystal just occupying its measuring position brought into a heat conducting pressure contact with the screen which is connected to the housing.

2. In an oscillator crystal measuring head, the improvement according to claim 1, wherein the further screen apertures associated with the individual crystals are provided in a common rotary screen plate forming said support.

3. In an oscillator crystal measuring head, the improvement according to claim 1, wherein said rotary support is designed for displacement in the axial direction and for being brought, by means of a spring, into pressure contact with the screen fixed to the housing.

4. In an oscillator crystal measuring head, the improvement according to claim 1, wherein the housing is connected to a cooling device.

5. An oscillator crystal measuring head for coating apparatus used to determine the mass of substance which is being deposited on an oscillator crystal during a vapor stream deposition of a thin layer of material comprising:

a housing defining an oscillator crystal chamber;

a movable screen plate having a plurality of apertures therein rotatably mounted in said chamber;

mounting means connected to said movable screen plate for mounting an oscillator crystal over each of said apertures;

said housing having a fixed screen plate with a window therein, said movable screen plate movable to a plurality of positions with a single movable screen plate aperture aligned with said fixed screen plate window at a time to expose an oscillator crystal which is associated with said aligned movable screen plate aperture;

contact means connected to said housing and engageable with one of said mounting means at a time for establishing electrical contact with an oscillator crystal associated with said one mounting means; and biasing means connected between said housing and said movable screen plate for biasing said movable screen plate against said fixed screen plate to establish thermal contact therebetween.

6. An oscillator crystal measuring head according to claim 5, wherein said mounting means comprise at least two contact face portions of said movable screen plate adjacent each of said apertures for supporting an oscillator crystal, a contact pin mounted in said movable screen plate adjacent each of said contact faces for bearing against and holding an oscillator crystal against each contact face portion, each contact pin having an exposed portion facing said housing chamber, said contact means comprising a spring contact connected to said housing and extending into said housing chamber engageable with two contacts at a time which two contacts are adjacent a single movable screen plate aperture, which aperture is in alignment with said fixed screen plate window.

7. An oscillator crystal measuring head according to claim 6, wherein said movable screen plate is cylindrical, a shaft rotatably mounted to said housing and connected to said movable screen plate for permitting rotation of said movable screen plate, said biasing means comprising a spring on said shaft abutting said housing and said movable screen plate.

* * * * *